INVENTOR.
JOHN S. PILCH

BY Raymond A. Paquin
ATTORNEY.

Nov. 1, 1955　　　　　　　　J. S. PILCH　　　　　　　2,722,102
HYDRAULIC SYSTEM AND PRESSURE RELIEF VALVE THEREFOR
Filed May 27, 1952　　　　　　　　　　　　　　4 Sheets-Sheet 2

INVENTOR.
JOHN S. PILCH
BY Raymond A. Paquin
ATTORNEY.

INVENTOR.
JOHN S. PILCH
BY Raymond A. Paquin
ATTORNEY

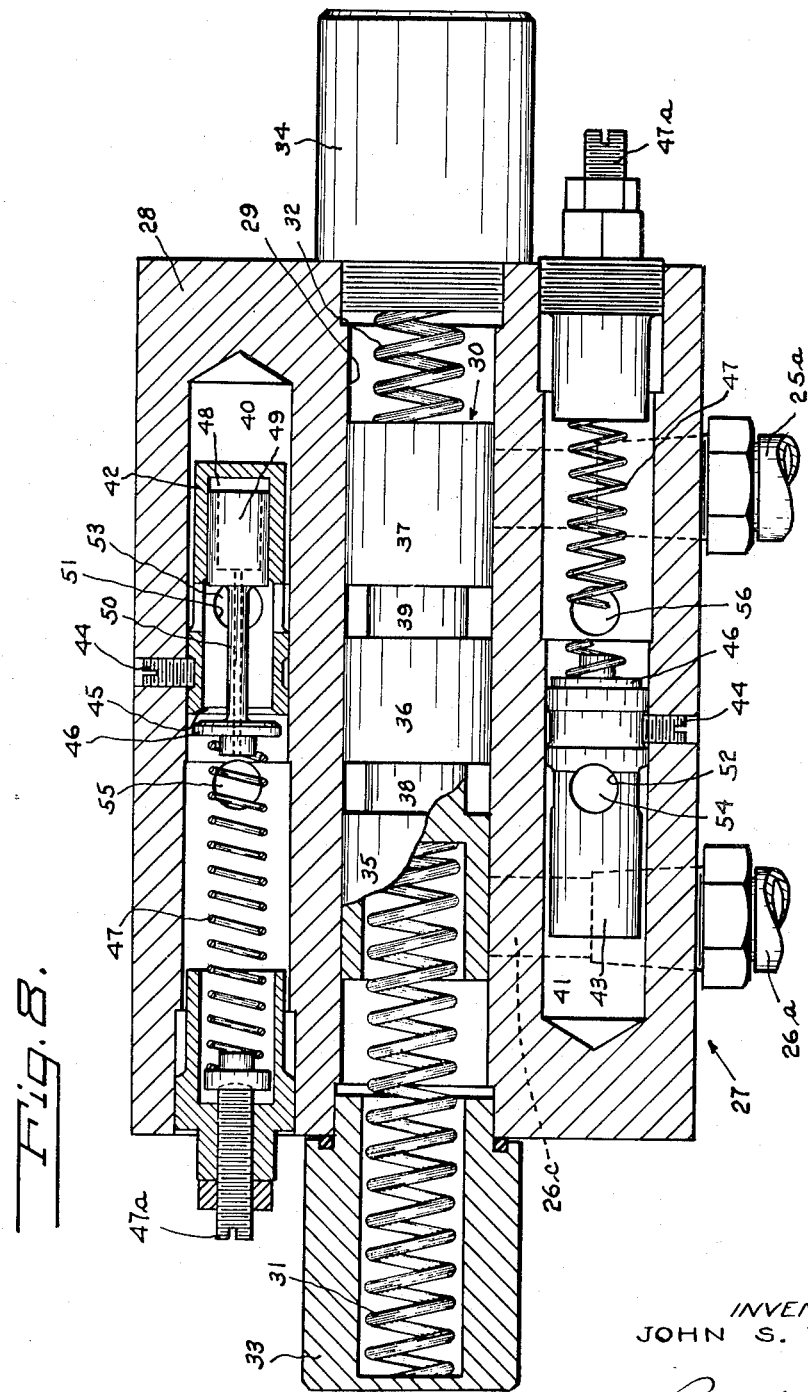

United States Patent Office 2,722,102
Patented Nov. 1, 1955

2,722,102

HYDRAULIC SYSTEM AND PRESSURE RELIEF VALVE THEREFOR

John S. Pilch, Ware, Mass.

Application May 27, 1952, Serial No. 290,297

7 Claims. (Cl. 60—52)

This invention relates to new and improved hydraulic systems and to new and improved valve means therefor.

An object of the invention is to provide a new and improved hydraulic system adapted for the hydraulic actuation of apparatus which system embodies automatically variable, set pressure relief valve means.

Another object is to provide a new and improved automatically variable, set pressure relief valve means for hydraulic systems.

Another object is to provide a new and improved hydraulic system and relief valve arrangement therefor, which embodies a plurality of relief valves and which automatically connects the proper relief valve to the system according to predetermined conditions in the system.

Another object is to provide a new and improved hydraulic system and relief valve arrangement therefor, for effecting actuation of apparatus which provides ample power when required and smooth stopping of apparatus and prevents damage caused by shock and breakage upon sudden stoppage of the apparatus or the hitting of objects thereby.

Another object is to provide a new and improved hydraulic system embodying valve means of the type set forth whereby positive control of the whole unit is retained at all times without play.

Another object is to provide a new and improved combined flow control and relief valve arrangement.

Another object of the invention is to provide a new and improved two-way relief valve.

Another object is to provide a new and improved two-way relief valve which embodies a plurality of relief valve means and wherein means is provided for automatically connecting the relief valve of desired pressure to the hydraulic system in accordance with the use being made of the system.

Other objects and advantages of the invention will be apparent from the following description taken in connection with the accompanying drawings. It will be understood that changes may be made in the details of construction and arrangement of parts shown and described without departing from the scope of the invention as set forth in the accompanying claims, as the preferred form has been given by way of illustration only.

Referring to the drawings:

Fig. 5 is a sectional view taken on line 5—5 of Fig. 3, looking in the direction of the arrows;

Fig. 6 is a sectional view taken on line 6—6 of Fig. 3, looking in the direction of the arrows;

Referring more particularly to the drawings wherein similar reference characters designate corresponding parts throughout, in the hydraulic system shown embodying the invention in Fig. 1, the invention is shown adapted for use on a hydraulically actuated trencher.

Figure 1:
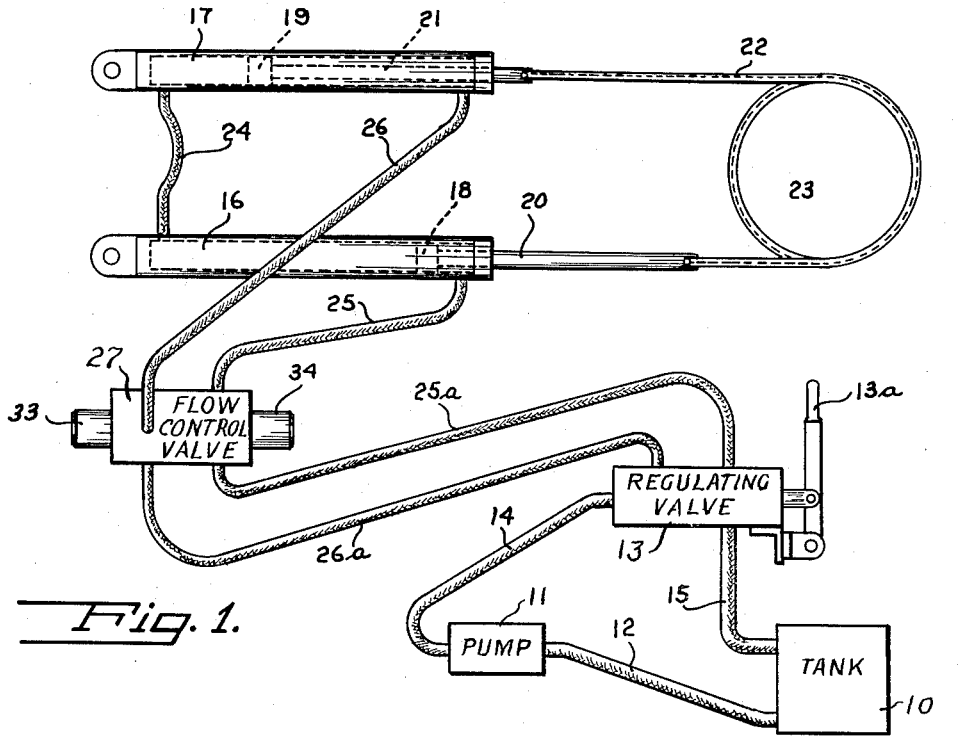
Fig. 1 is a diagrammatic view showing one form of hydrauulic system embodying the invention.
Figures 2, 3:
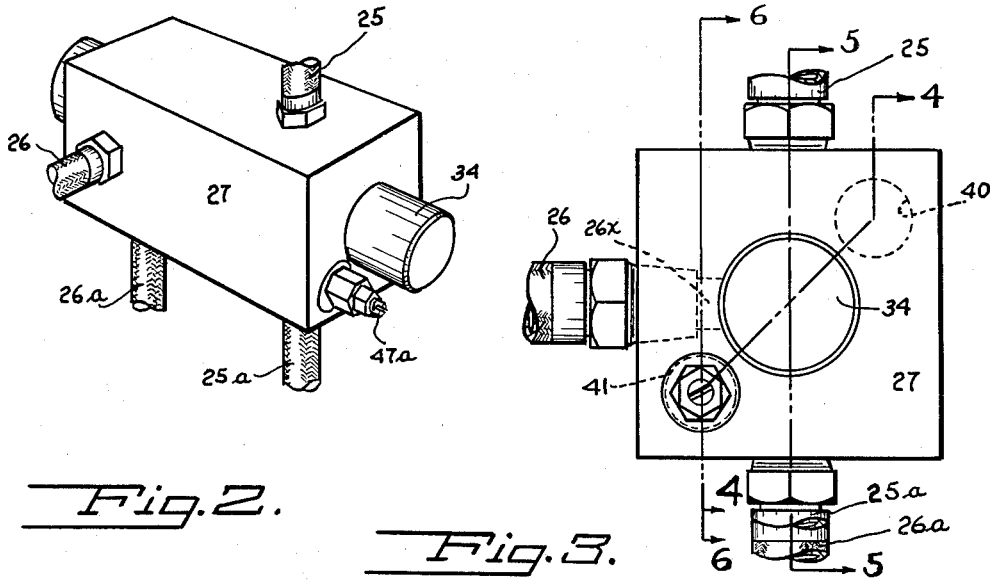
Fig. 2 is a perspective view of one form of relief valve.
Fig. 3 is an end view of the valve shown in Fig. 2.
Figure 3:
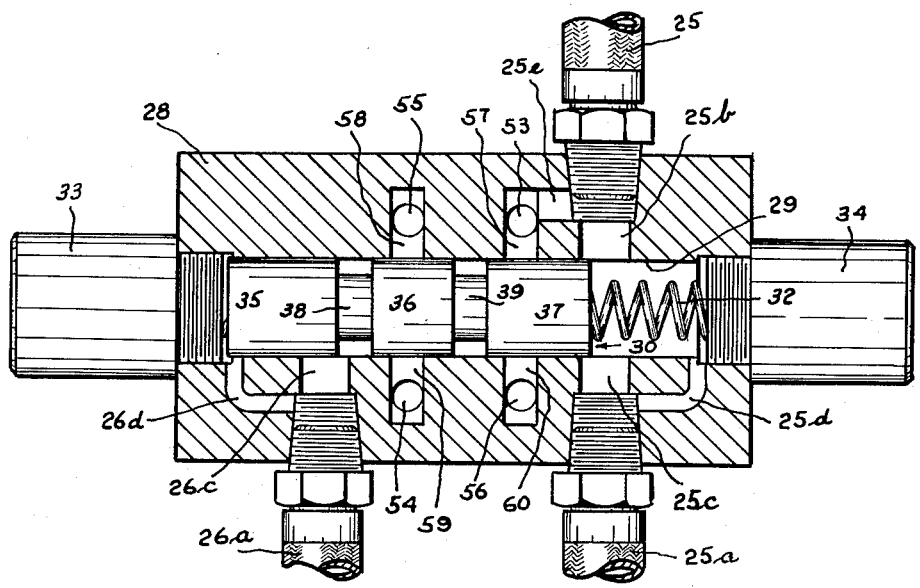
Figure 4:
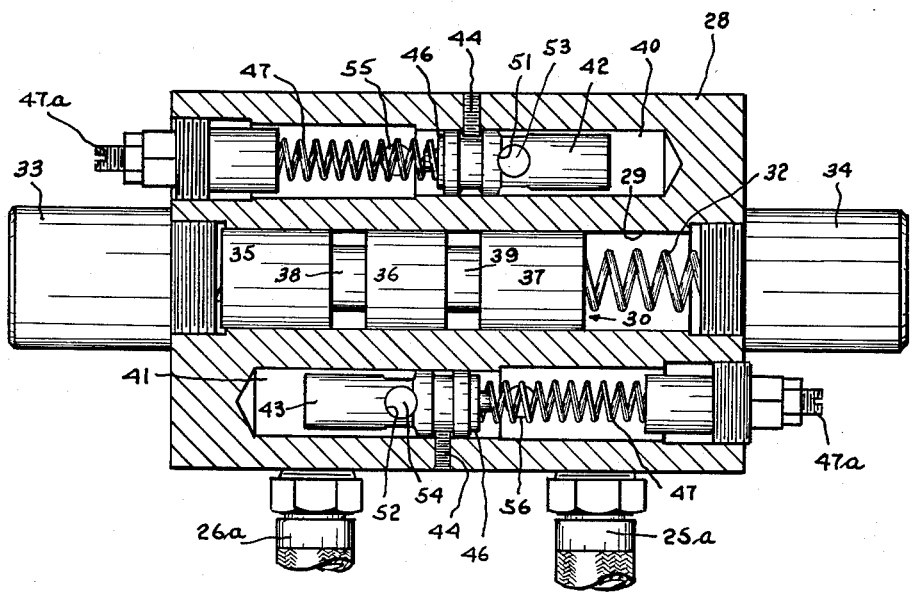
Fig. 4 is a sectional view taken on line 4—4 of Fig. 3, looking in the direction of the arrows.

In this figure, the hydraulic system embodies the fluid tank 10, connected to the hydrauulic pump 11 by the low pressure line 12 and pump 11 is connected to regulating valve 13 having operating lever 13a, by high pressure line 14. Regulating valve 13 is also connected to tank 10 by low pressure return line 15.

In hydraulic cylinders 16 and 17 are double acting pistons 18 and 19, and rams 20 and 21 to which are connected the chain or flexible drive member 22 which extend around pivotal turret or spool 23 adapted to be connected to the boom of the trencher.

Cylinders 16 and 17 are directly connected adjacent one end by hydraulic line 24 and at their opposite ends are connected by hydraulic lines 25 and 26 to valve assembly 27 which is connected by hydraulic lines 25a and 26a to regulating valve 13.

Valve assembly 27 comprises a housing 28 having a main valve bore or cylinder 29 in which is slidably mounted piston or plunger 30 of the flow control or main valve which is spring loaded at its opposite ends by springs 31 and 32 which extend into hollow housing extensions 33 and 34 respectively.

Cylinder or plunger 30 is provided with the three land portions 35, 36 and 37 separated by the reduced diameter neck portions 38 and 39.

Also in housing 28 are provided the relief valve bores or cylinders 40 and 41 containing the poppet valve members 42 and 43 respectively. Valve members 42 and 43 are retained in position in bores 40 and 41 by means of set screws or the like 44. Said valve members 42 and 43 each have an open end 45 adapted to be closed by a plate member 46 which is engaged by spring 47, the tension of which is controlled by an adjusting screw 47a.

Valve members 42 and 43 each have an internal bore or cylinder 48 in which is slidably mounted a piston member 49 which is connected to plate 46 by reduced neck portion 50.

Also, each of poppet valve members 42 and 43 has the ports 51 and 52 in its side walls and adapted to be in communication with ports 53 and 54 respectively. Bores 40 and 41 are also provided with ports 55 and 56 respectively.

Port 51 in member 42 communicates with bore 29 through port 53 in body 28 and duct 57, port 55 communicates with bore 29 through duct 58, port 52 in member 43 communicates with bore 29 through port 54 in body 28 and duct 59 and duct 56 communicates with bore 29 through duct 60.

Hydraulic line 25 communicates with bore 29 through port 25b and hydraulic line 25a communicates with bore 29 directly through port 25c and also through small bypass port 25d. Hydraulic line 26a communicates with bore 29 directly through port 26c and also through small bypass port 26d. Hydraulic line 25 and port 25b communicate with duct 57 and port 51 through port 25e.

Hydraulic line 26 communicates with bore 29 through port 26x.

In hydraulic systems embodying the invention, that is, systems incorporating the relief valve system of the present invention, the main or usual relief valve (not shown) is set to provide relief action only at a relatively high pressure, for example, 1200 p. s. i. whereas the auxiliary or low pressure relief valves are set to provide relief action at relatively low pressures, for example, 100 p. s. i. If these auxiliary or low pressure relief valves were always in communication with the hydraulic system, then the main relief valve setting would not be important because the low pressure setting of the auxiliary valves would effect relief at the pressure setting of the auxiliary valves in all cases and sufficient power would not always be available whereas, with the present arrangement, the auxiliary valves only are in communication with the hydraulic lines when no power is being applied through the pressure lines, that is, when lever 13a of regulating valve 13 is in closed position.

It will thus be seen that when pressure is being applied to either cylinder 16 or cylinder 17, through the lines that the main high pressure relief valve is operative to provide high pressure relief and provide sufficient power for operation, but that when no power is being applied to either cylinder 16 or 17 through the hydraulic lines, the low pressure or auxiliary relief valves are in communication with the hydraulic lines thus providing smooth stop of swing of the boom which requires low pressure relief setting and prevents damage to apparatus which might otherwise be caused by shock due to sudden stoppage, or hitting of an object by the boom during movement of the apparatus even with the pressure shut off as the low pressure setting of the auxiliary valves would allow movement or retraction of the cylinders without injury to or breakage of the apparatus.

The action of the auxiliary relief valves is as follows:

Fluid from line 25 passes through duct 25e through duct 57 into port 51 which leads into bore 40 and passes through port 53 into bore 48 and when the pressure of such fluid is sufficient opens plate or cap 46, that is, blows off the poppet. This fluid then passes through port 55 from which it passes through duct 58 across the spool through duct 59 and up into port 54 around an undercut in bore 41, through duct 61 and into port 26x and out into the opposite end of the cylinder.

Fluid from 26x goes through 61 around the poppet body in bore 41 to port 54 in poppet body, then opens head 46 and passes into port 56 then down to duct 60 across the spool to duct 57 and duct 25e to port 25b and back to the starting side of the cylinder.

The object of the valve of the present invention is to control the passing of fluid from lines 25a and 26a to lines 25 or 26.

Figure 7:
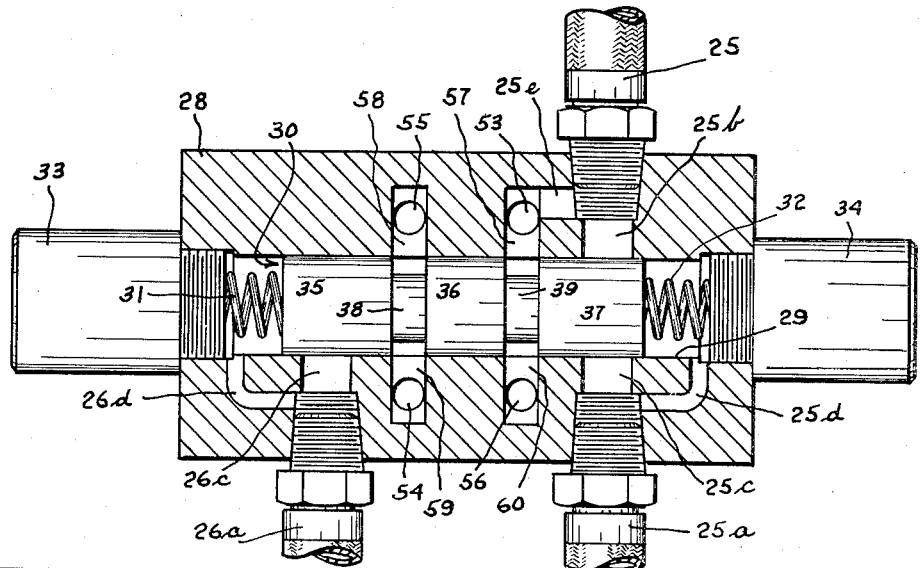
Fig. 7 is a view generally similar to Fig. 5, but showing a further step in the operation of the valve.
Figure 8:
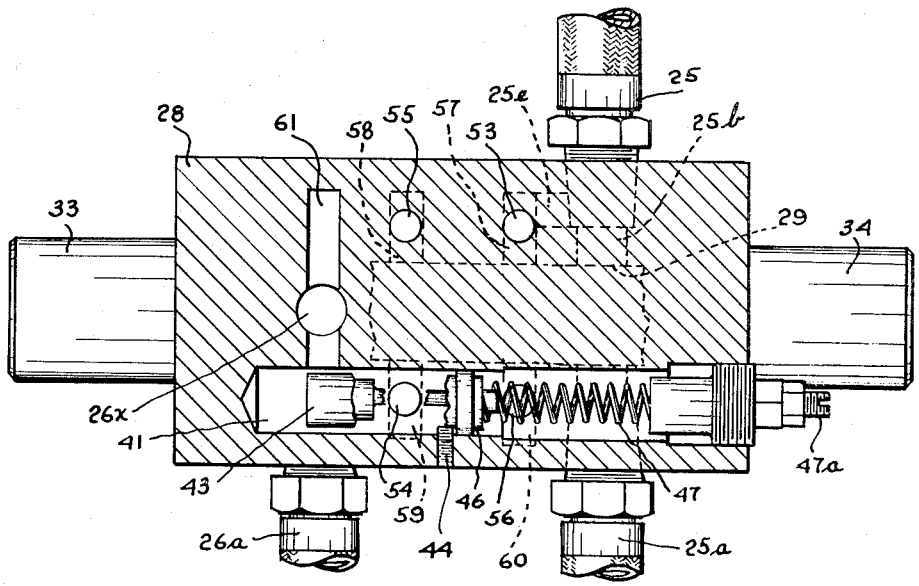
Fig. 8 is a sectional view generally similar to Fig. 4, but on an enlarged scale and showing a sectional view of various parts of the valve.

It will be noted, for example as shown in Figure 5, that when either lines 25 and 25a or 26 and 26a are functioning as high pressure lines to provide fluid under pressure to either of cylinders 16 or 17, that lands 35, 36 or 37 will cover and close ducts 57, 58, 59 and 60, thus placing the low pressure relief valves out of communication with the hydraulic system and such valves are, therefore, ineffective and the system relief is provided by the usual high pressure relief valve (not shown) to provide desired power. When, however, control lever 13a of control valve 13 is released to discontinue the supply of high pressure fluid to cylinders 16 and 17, then valve 30 is automatically longitudinally moved to neutral position as shown in Fig. 7 at which time lands 35 and 37 shut off communication between lines 25 and 25a, and lines 26 and 26a and reduced neck portions establish communication between ducts 57 and 60, and ducts 58 and 59, thus establishing communication between each of the low pressure relief valves and its respective high pressure line.

When lever 13a of control valve 13 is moved to supply high pressure fluid through either line 25a or 26a, at which time ports 25c and 26c are closed by lands 35 and 37 of valve 30, it is necessary that fluid first enters through either bypass duct 25d or 26d to push valve or spool 30 to the right or left as the case may be, so that ports 25c and 26c are opened and in communication with lines 25 and 26 respectively. Due to the off-timing of ports 25c and 26c or lands 35 and 37, the opening of the port communicating with the return line will be delayed until after the pressure port has been opened and communication established in the pressure line. This will insure that pressure will be supplied to cylinder 16 or cylinder 17, according to the movement of the valve, before the hydraulic line to the opposite cylinder 17 or 16 respectively, is opened to the return line.

It is pointed out that the present invention is applicable to hydraulic systems employing two cylinders or a double ended cylinder and it is also capable of employment in other applications.

From the foregoing it will be seen that I have provided simple, efficient and economical means for obtaining all of the objects and advantages of the invention.

I claim:

1. In a hydraulic system including cylinder means having piston means therein, a source of fluid, a pump and regulating valve means for supplying fluid under pressure to said cylinder means for actuating said piston means, a flow controlling unit interposed between said regulating valve and said cylinder means and hydraulic lines operatively connecting said pump, regulating valve means, cylinder means, and flow controlling unit, said flow controlling unit comprising a housing having a main valve bore communicating with said hydraulic lines and a plurality of relief valve bores each adapted to communicate with said main valve bore and with one of said hydraulic lines, a spring loaded pressure operated valve mounted for reciprocation in said main valve bore, relief valve members in each of said relief valve bores, said valve in said main valve bore having means for preventing communication of said relief valves with said hydraulic lines while fluid is supplied under pressure to said cylinder means.

2. In a hydraulic system including cylinder means having piston means therein, a source of fluid, a pump and regulating valve means for supplying fluid under pressure to said cylinder means for actuating said piston means, a flow controlling unit interposed between said regulating valve and said cylinder means and hydraulic lines operatively connecting said pump, regulating valve cylinder means, and flow controlling unit, said flow controlling unit comprising a housing having a main valve bore communicating with said hydraulic lines and a plurality of relief valve bores each adapted to communicate with said main valve bore and with one of said hydraulic lines, a spring loaded pressure operated valve mounted for reciprocation in said main valve bore, relatively low pressure relief valve members in each of said relief valve bores, said valve in said main valve bore having means for preventing communication of said relatively low pressure relief valves with said hydraulic lines while fluid is supplied under pressure to said cylinder means.

3. In a hydraulic system including cylinder means having piston means therein, a source of fluid, a pump and regulating valve means for supplying fluid under pressure to said cylinder means for actuating said piston means, a flow controlling unit interposed between said regulating valve and said cylinder means and hydraulic lines operatively connecting said pump, regulating valve means, cylinder means, and flow controlling unit, said flow controlling unit comprising a housing having a main valve bore communicating with said hydraulic lines and a plurality of relief valve bores each adapted to communicate with said main valve bore and with one of said hydraulic lines, a spring loaded pressure operated valve mounted for reciprocation in said main valve bore, relief valve members in each of said relief valve bores, said valve in said main valve bore having means for automatically preventing communication of said relief valves with said hydraulic lines while fluid is supplied under pressure to said cylinder means.

4. In a hydraulic system including cylinder means having piston means therein, a source of fluid, a pump and regulating valve means for supplying fluid under pressure to said cylinder means for actuating said piston means, a flow controlling unit interposed between said regulating valve and said cylinder means and hydraulic lines operatively connecting said pump, regulating valve means, cylinder means, and flow controlling unit, said flow controlling unit comprising a housing having a main valve bore communicating with said hydraulic lines and a plurality of relief valve bores each adapted to communicate with said main valve bore and with one of said hydraulic lines, a spring loaded pressure operated valve mounted for reciprocation in said main valve bore, relatively low pressure relief valve members in each of said relief valve bores, said valve in said main valve bore having means for automatically preventing communication of said relatively low pressure relief valves with said hydraulic lines while fluid is supplied under pressure to said cylinder means.

5. In a hydraulic system including cylinder means having piston means therein, a source of fluid, a pump and regulating valve means for supplying fluid under pressure to said cylinder means for actuating said piston means, a flow controlling unit interposed between said regulating valve and said cylinder means and hydraulic lines operatively connecting said pump, regulating valve means, cylinder means, and flow controlling unit, said flow controlling unit comprising a housing having a main valve bore communicating with said hydraulic lines and a plurality of relief valve bores each adapted to communicate with said main valve bore and with one of said hydraulic lines, a spring loaded pressure operated valve mounted for reciprocation in said main valve bore, relatively low pressure relief valve members in each of said relief valve bores, said valve in said main valve bore having means for preventing communication of said relatively low pressure relief valves with said hydraulic lines while fluid is supplied under pressure to said cylinder means and a high pressure relief valve connected to said hydraulic lines.

6. In a hydraulic system including cylinder means having piston means therein, a source of fluid, a pump and regulating valve means for supplying fluid under pressure to said cylinder means on opposite sides of said piston means, a flow controlling unit, and hydraulic lines operatively connecting said pump, regulating valve means, cylinder means and flow controlling unit, said flow controlling unit comprising a housing having a main valve bore communicating with said hydraulic lines and a pair of relief valve bores, a valve mounted for reciprocation in said main valve bore, said valve being spring loaded in opposite directions and operated by fluid pressure, relatively low pressure relief valve members in each of said pair of relief valve bores and adapted to communicate with said high pressure lines and said main valve bore, said low pressure relief valves being in communication with said hydraulic lines only when hydraulic pressure is not being applied to said hydraulic cylinder and piston means, said valve in said main valve bore having means for preventing communication of said low pressure relief valves with said hydraulic lines while fluid is supplied under pressure to said cylinder and piston means.

7. In a hydraulic system including cylinder means having piston means therein, a source of fluid, a pump and regulating valve means for supplying fluid under pressure to said cylinder means on opposite sides of said piston means, and a flow controlling unit, and hydraulic lines operatively connecting said pump, regulating valve means, cylinder means and flow controlling unit, said flow controlling unit comprising a housing having a main valve bore communicating with said hydraulic lines and a pair of relief valve bores, a valve mounted for reciprocation in said main valve bore, said valve being spring loaded in opposite directions and operated by fluid pressure, relatively low pressure relief valve members in each of said pair of relief valve bores and adapted to communicate with said high pressure lines and said main valve bore, said low pressure relief valves being in communication with said hydraulic lines only when hydraulic pressure is not being applied to said hydraulic cylinder and piston means, said valve in said main valve bore having means for automatically preventing communication of said low pressure relief valves with said hydraulic lines while fluid is supplied under pressure to said cylinder and piston means.

References Cited in the file of this patent

UNITED STATES PATENTS

| | | |
|---|---|---|
| 1,912,184 | Ferris | May 30, 1933 |
| 2,036,237 | Sibbe | Apr. 7, 1936 |
| 2,044,777 | Erling | June 23, 1936 |
| 2,103,984 | Indge | Dec. 28, 1937 |
| 2,454,551 | Carlson | Nov. 23, 1948 |
| 2,550,529 | Carson et al. | Apr. 24, 1951 |